(12) United States Patent
Mahlich et al.

(10) Patent No.: US 7,992,488 B2
(45) Date of Patent: Aug. 9, 2011

(54) PROCESS FOR GENERATING MILK FROTH FROM MILK POWDER AND MILK FROTH GENERATING DEVICE AND COFFEE MACHINE SUITABLE FOR PERFORMING THIS PROCESS

(75) Inventors: Gotthard Mahlich, Kronberg (DE); Arthur Eugster, Romanshorn (CH)

(73) Assignee: Eugster/Frismag AG, Romanshorn (CH)

( * ) Notice: Subject to any disclaimer, the term of this patent is extended or adjusted under 35 U.S.C. 154(b) by 1162 days.

(21) Appl. No.: 11/708,954

(22) Filed: Feb. 21, 2007

(65) Prior Publication Data
US 2009/0011105 A1 Jan. 8, 2009

(30) Foreign Application Priority Data
Feb. 21, 2006 (DE) .......................... 10 2006 008 341

(51) Int. Cl.
*A47J 31/00* (2006.01)
*B05B 1/00* (2006.01)
(52) U.S. Cl. .......................................... 99/287; 99/315
(58) Field of Classification Search ............... 99/315, 99/290, 287, 323.1; 239/558, 559, 533.14, 239/602; 366/137.1, 167.1; 222/129.1
See application file for complete search history.

(56) References Cited

U.S. PATENT DOCUMENTS

| | | | | |
|---|---|---|---|---|
| 4,388,338 A * | 6/1983 | Wittenborg | ................... | 426/590 |
| 6,244,162 B1 * | 6/2001 | Dahmen | ........................ | 99/315 |
| 6,631,859 B2 * | 10/2003 | Schmidt | ..................... | 239/587.3 |
| 6,745,847 B2 * | 6/2004 | Kim | ................................ | 169/37 |
| 7,669,519 B2 * | 3/2010 | Pope et al. | ...................... | 99/315 |
| 7,685,932 B2 * | 3/2010 | Rahn et al. | ..................... | 99/315 |
| 2003/0131735 A1 | 7/2003 | Johnson et al. | | |

FOREIGN PATENT DOCUMENTS

| | | |
|---|---|---|
| DE | 29502594 U1 | 4/1995 |
| EP | 1407698 A | 4/2004 |
| WO | WO 90/10411 | 9/1990 |

* cited by examiner

*Primary Examiner* — Reginald L Alexander
(74) *Attorney, Agent, or Firm* — DLA Piper LLP (US)

(57) ABSTRACT

Milk froth generating device for generating milk froth from milk powder (7) and hot water comprises a hot water supply and a water heater. For simply obtaining milk froth of high quality, the milk froth generating device comprises a substantially rotation-symmetrical hot water sprayer head having hot water channels (9, 12) downwardly directed and open at the bottom. Some of them are disposed close to an outer convex surface (10) of the hot water sprayer head and some extending close to a central axis of the hot water sprayer head (1). The hot water channels are connected via a hot water distribution chamber (16) in the hot water sprayer head, and the hot water supply (17) with a hot water pressure generator and the water heater.

15 Claims, 2 Drawing Sheets

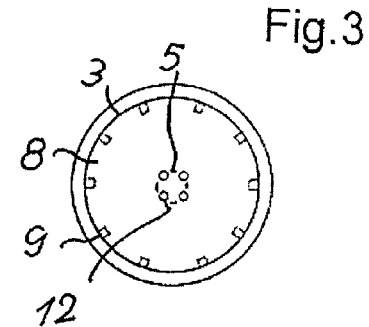
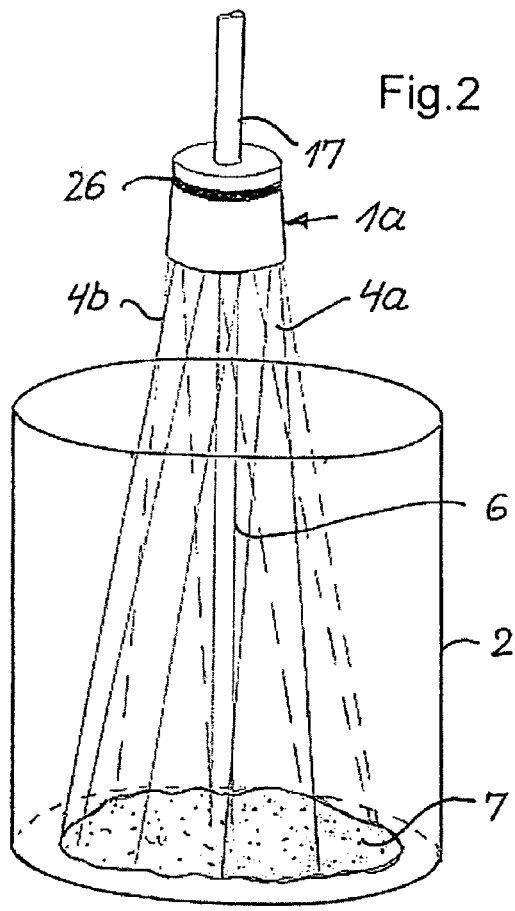
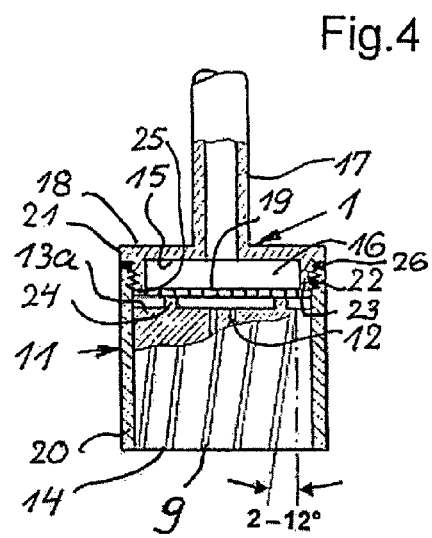
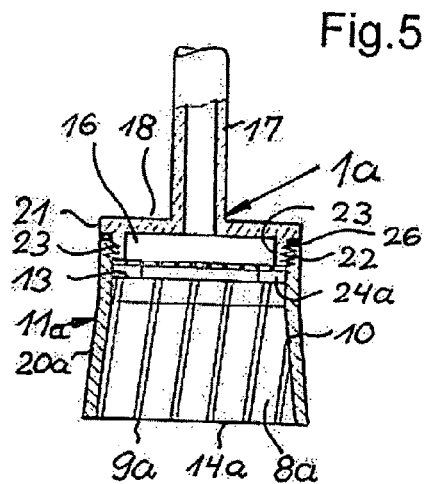
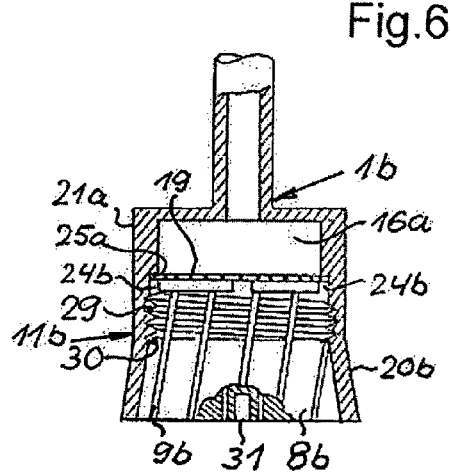

US 7,992,488 B2

PROCESS FOR GENERATING MILK FROTH FROM MILK POWDER AND MILK FROTH GENERATING DEVICE AND COFFEE MACHINE SUITABLE FOR PERFORMING THIS PROCESS

BACKGROUND OF THE INVENTION

1. Field of Invention

The present invention relates to a process for generating milk froth from milk power and hot water using a milk froth generating device.

2. Description of Related Art

For frothing up milk to prepare a cappuccino, the espresso machines are in most cases provided with steam nozzles. For the generation of milk froth, the outlet of the steam nozzle is guided manually over the surface of milk prepared in a vessel so that when releasing the steam, a three-phase zone comprising steam-air-milk is formed generating the milk froth. In most cases, this process can optimally be mastered by professional users only.

For this reason, so-called frothing aids have been developed wherein the steam outlet is simply submerged under the surface of the milk, and by means of a Venturi tube provided in the frothing aid via an air supply duct remaining above the milk surface, air is drawn in the steam outlet by the under pressure generated by the flowing steam so that the three-phase zone is formed under the milk surface and frothing of milk is thus also made possible for users having no practice.

It is a disadvantage of the two methods that both the simple steam nozzles and the frothing aids will be heated in view of the passing hot steam that much that milk remains may stick to the parts of the nozzle in contact with the milk and may even get burned. In case of simple steam nozzles, this contact occurs because when the milk froth is being generated, the three-phase zone is increasingly below the frothing foam and the milk froth will, therefore, stick to the nozzle. In the case of the frothing aids, sticking together is caused by the system considering that the frothing aids are submerged in the milk. In both cases, the soiled parts of the device have to be thoroughly cleaned after use. While nozzles made of poorly heat conducting material might make improvements possible by a smaller tendency to sticking, they do not, however, solve the soiling and cleaning problem.

One cleaning problem is also observed in case of prior art milk frothing systems where by means of the passing steam milk is drawn via a hose duct from a container into a frothing chamber in which it is frothed up and continues to flow directly into the drinking cup. In these systems, hose supply ducts and frothing system have to be thoroughly rinsed with water in order to avoid soiling by milk remains.

Milk froth generation from fresh milk causes a further problem. On one hand, the fat content of the milk determines the quality of the milk froth being made as to pore size and stability, and on the other, the milk should be relatively cold. The keeping of defined fat content limits and temperature limits of the milk is therefore of significance for the frothing result. A further disadvantage of milk froth generation based on cold fresh milk results from the fact that while the hot steam warms during the course of the generation of the milk froth the remaining milk in the frothing vessel, the remaining milk which in most cases, for instance in case of a cappuccino, is added to the coffee in addition to the milk froth displayed on the coffee will not reach the coffee temperature and will, therefore, cool down the coffee, which is highly undesired.

The state of the art includes also a milk froth generating device of a house hold coffee machine by means of which milk frothing should be simplified by using the steam supply duct of the coffee machine (EP-A-0 509 505). The milk froth generating device comprises a laminarization cone solidly affixed to the steam supply duct under discharge openings at the otherwise closed end of the steam supply duct. The discharge openings are aligned, or inclined, so that the discharged steam jets are guided along the outer surface of the laminarization cone thereby dragging air for the frothing effect along, whereby a laminar flow of the steam is generated on the cone surface in order to improve the penetration of the steam jets into the milk and whereby in the milk into which the laminarization cone is partly submerged a turbulence is generated in order to improve frothing of the milk. This milk froth generating device has the above-described cleaning problem since the laminarization cone has to be submerged in the milk. The laminarization cone, furthermore, has to solve two contrasting partial tasks, namely dragging air along to perform the frothing effect and generating turbulence in the milk, on one hand, and to partly laminarize the steam jets for a deep penetration into the milk, on the other. For the preparation of hot beverages of instant powder, this prior art device has proved to be unsuitable.

The state of the art known from practice includes, furthermore, beverage preparing and vending machines where a vessel is provided into which, first, milk powder is dosed in and afterwards hot water essentially under atmospheric pressure is introduced whereupon, subsequently, the milk powder is dissolved by means of a machine-powered whisk, and by simultaneous intermixing ambient air milk froth is generated from it. Thereafter, the whisk can be taken from the vessel to be rinsed and espresso, or coffee, can be introduced below the froth to make the beverage ready. This milk froth generation is awkward particularly with a view to the required cleaning of the whisk, and the device to be used for performing the process is mechanically complicated.

SUMMARY OF THE INVENTION

It is the object of the present invention to provide an improved process for generating milk froth from milk powder and hot water by which milk froth of high quality is generated simply in one operation without using fresh milk and rinsing or cleaning processes can be reduced.

A milk froth generating device suited for performing the process should need little maintenance and should be reliable, and to this end should be assembled by as few movable parts as possible.

This problem can be surprisingly simply be solved in that the milk froth is generated from milk powder which is treated with hot water jets which under sufficient hot water pressure flow out pointedly from the milk froth generating device. The hot water pressure is sufficient when it has the altitude typical for espresso machines which is either generated by a water pump with a following continuous-flow heater or by a hot water boiler from which heated water is discharged by steam pressure. By the water jets discharged under such pressure, the milk powder accumulated and dosed for milk froth preparation of one beverage portion in a frothing vessel is rapidly penetrated and dissolved whereby under the inclusion of air milk froth will almost instantaneously be generated. By means of the hot water jets, sufficient kinetic energy can, therefore, be introduced into the accumulated milk powder to perform the functions referred to above without undesirably blowing the accumulated milk powder partly away or damaging it by a too-high temperature.

A milk froth generating device according to the invention suited for performing this process comprises a substantially axially symmetrical hot water sprayer head having hot water channels and provide for a uniform distribution of the hot water jets discharged from them. On the outside, the hot water sprayer head may be shaped to be favorable in production and user-friendly, substantially cylindrical or as a truncated cone. The milk froth generating device includes in addition to a hot water heater, a hot water pressure generator in connection via a hot water duct with the hot water sprayer head.

In one embodiment, the functions of water heating and hot water pressure generation or increase, respectively, may through the use of a water pump before a water heater, which in this case may be a simple continuous flow heater, be separated which makes constant hot water pressure possible. Instead, these function may, however, also be combined in a water boiler which does not only heat the water but discharges it also under hot water or vapor pressure.

Of particular advantage is an integration of the milk froth generating device of the invention with a coffee machine, since in this case the water heaters thereof and the hot water pressure generators thereof may be used for the generation of milk froth from milk powder according to the process of the present invention without, surprisingly, requiring different dimensioning particularly of the hot water pressure generator.

In order to generate milk froth by using a coffee machine, particularly in an espresso machine, which provides the hot water under pressure for frothing, and by using milk powder instead of milk as otherwise common with coffee machines and espresso machines, a defined amount of milk powder is, first, filled into a vessel open on top whereupon the latter is put under the hot water sprayer head of the milk froth generating device so that the milk powder is disposed spaced under the hot water sprayer head. Subsequently, hot water supply to the hot water sprayer head may be initiated. The hot water flowing into the hot water sprayer head emerges from it under high pressure and following the configuration of the hot water channels in the hot water sprayer head is flushed over the milk powder and, by its kinetic energy, also into the milk powder. The milk powder is thus uniformly and rapidly dissolved so that it gets into a state in which milk froth generation is increasingly performed. For the milk froth generation, the hot water jets flowing from the hot water channels have such a velocity that air is dragged along, and they have that much kinetic energy that when impinging onto the milk being formed in the vessel they will immediately froth it up. To this end, the hot water sprayer head is aligned so that it is always above the froth being formed and thus remains substantially free from soiling through milk remains. By constant composition of the milk powder and of the temperature exactly controlled in coffee machines and of the prescribed pressure of the hot water, milk froth generation of uniformly good quality is assured. An additional advantage consists in that cappuccino to which milk froth is added generated according to this process from the frothing vessel will not cool down when simultaneously adding residual milk.

Suitable embodiments of the milk froth generating device according to the invention and thus of the coffee machine in which it is employed are described in the Detailed Description of the Invention below.

To uniformly distribute the hot water jets on the milk powder accumulated in a frothing vessel, it has proved to be very suitable when near the outer convex surface of the hot water sprayer head, about 10 hot water channels are disposed circumferentially spaced uniformly relative to each other and, close to the central axis of the hot water sprayer head, 3 to 4 hot water channels are disposed circumferentially spaced uniformly relative to each other.

A considerable improvement of milk froth generation from milk power is obtained by a defined sloping arrangement of the hot water channels provided close to the outer shall surface of the hot water sprayer head. Trials have shown that an inclination of the hot water channels disposed closed to the outer convex surface about 2 to 12° relative to the perpendicular is suitable, whereby it is sufficient that only one lower section each of such hot water channel is inclined while the section above it which provides for the connection to the hot water supply, may be straight vertical Still further, the hot water channels disposed close to the outer convex surface may, favorable for the production, generally be inclined relative to the perpendicular in the way referred to, i.e. about 2 to 12° relative to the perpendicular.

In the case of the above alternative embodiments of the hot water channels disposed close to the outer convex surface, it is essential that the outer hot water jets come out from them corresponding to the sloping hot water channel path, at least in the lower sections thereof with a twist in circumferential direction of the hot water sprayer head and impinge with the twist on the milk powder. This promotes both intimate mixing of the powder with the hot water and almost simultaneous frothing. The water jets coming out near the central axis of the hot water head, on the other hand, may, corresponding to the vertical path of the hot water channels disposed in this area of the hot water sprayer head, come out perpendicularly and impinge on the milk powder since they are almost extensively screened by a curtain of the hot water jets flowing with a twist from the outer hot water channels from the outer surrounding. The very effective sprayer head may compactly be made having for instance an outer diameter of 20 mm, the dimensions of the sprayer head being uncritical.

Structurally, and of advantage for uniform hot water jet configuration, the hot water sprayer head of the coffee machine is designed to include a cylindrical inner body and a pot-shaped outer body enclosing the inner body. From the outer convex surface of the cylindrical inner body the hot water channels are essentially formed as laterally open hot water channels or slits. The hot water channels are completed by an inner convex surface of the pot-shaped outer body slipped over the inner body, which laterally screens tightly the hot water channels. The screened hot water channel slits in the shall surface of the inner body may in case of rectangular cross sectional areas for instance be 0.2 mm wide and 0.2 mm deep. Differently shaped cross sections having identical or similar passage surfaces, however, are possible as well.

The hot water channels perpendicularly disposed close to the central axis of the hot water sprayer head may consist of cylindrical holes which are simply produced, for instance by drilling and may have about the same passage surfaces as the outer hot water channels.

To assure that all hot water channels are evenly filled with the hot water fed via the hot water supply duct, the hot water sprayer head suitably includes a hot water distribution chamber which is left free between one upper side of the outer body and an upper side of the inner body and into which opens the hot water supply duct. In this way, the individual hot water channels are evenly supplied with the hot water via the hot water distribution chamber.

In the present description, the hot water channels essentially shaped out from the outer convex surface of the inner body are also referred to as outer hot water channels, and hot water channels formed as bores close to the central axis of the inner body are also referred to as inner hot water channels.

In one embodiment of the hot water sprayer head, the inner body, and therefore also the ring covering it, in some cases with the exception of a section serving the fixation of the inner body in the ring, broadens downwardly in a truncated cone-shaped manner. In addition, the outer hot water channels are in this case, also relative to the imaginary central axis of the hot water sprayer head, not only sloped in circumferential direction but also radially. Correspondingly, the outer hot water jets from the hot water sprayer head do not only spout sloping relative to the vertical in circumferential direction but also downwardly broadened in radial direction. In this way, a larger portion, or surface, respectively, of milk powder can be treated with the hot water jets. Here, the inner hot water jets may also spout perpendicularly, as in the embodiment with the cylindrical inner body.

The substantially truncated cone-shaped inner body and the outer body covering it with a ring section, each, may include an upper cylindrical section serving for fixing, easily removable if necessary, the inner body in the outer body, said upper cylindrical section being provided with fixing elements, particularly a thread which is shaped in the inner body as an external thread penetrated by sections of the hot water channel slits.

Instead of the cylindrical section, the truncated cone-shaped inner body may include for an unthreaded connection a band which fits into an inner ring groove in the truncated cone-shaped ring into which the inner body can be inserted. The inner body and/or the ring are to this end made of elastic material such as Neoprene so that the ring is force-lockingly, though manually releasably, supported.

In the hot water sprayer head, between the hot water distribution chamber and the hot water channels, there is advantageously provided a sieve in order to avid clogging of the hot water channels having small free cross sections by small particles that are fed in together with the hot water. The sieve is correspondingly fine-meshed.

Also, the sieve can suitably be supported by a spacer formed from the upper side of the inner body, which spacer might be a distance ring formed-out between the arrangement of the hot water channels in the outer convex surface of the inner body and the arrangement of the hot water channels close to the central axis.

For an easy assembly of the sieve and in order to provide the interior of the hot water sprayer head accessible for maintenance, particularly cleaning, the features of the present invention advantageously provide that the pot-shaped outer body consists of an upper part and a cylindrical ring screwed into it which is solidly connected with the cylindrical inner body, while from the upper part the inside flange is formed which includes an external thread so that it can be screwed to an internal thread in the upper section of the cylindrical ring. For maintenance, particularly for cleaning the sieve, the cylindrical ring may together with the inner part simply be screwed off from the upper part so that the sieve and the hot water distribution chamber are completely exposed. In the screwed-together state, the interior space and the hot water distribution chamber are suitably sealed to the outside by a sealing ring between the upper part and the cylindrical ring. The opening possibility for maintenance is also made possible in the case of the substantially truncated cone-shaped inner body and the ring.

In order to exclude scalding of the operator of the milk froth generating device even if he or she is unskillful or inattentive, the froth generating device consists preferably of poorly thermo-conductive material.

BRIEF DESCRIPTION OF THE DRAWINGS

Exemplified embodiments of the invention will in the following be described based on a drawing including six figures from which further details and advantageous features of the invention will be come apparent and wherein FIG. 2 shows a hot water sprayer head including hot water supply duct, shown in broken lines, over a frothing vessel containing milk powder in working position and in function, FIG. 3 shows an underside of the hot water sprayer head, FIG. 4 shows a lateral view, partly in cross section, through a first embodiment of the hot water sprayer head, FIG. 5 shows a lateral view, partly in cross section, through a second embodiment of the hot water sprayer head, and FIG. 6 shows a lateral view, partly in cross section, through a third, preferred, embodiment of the hot water sprayer head.

In all the figures, corresponding parts are given identical reference numerals.

DETAILED DESCRIPTION OF THE INVENTION

Figure 1:
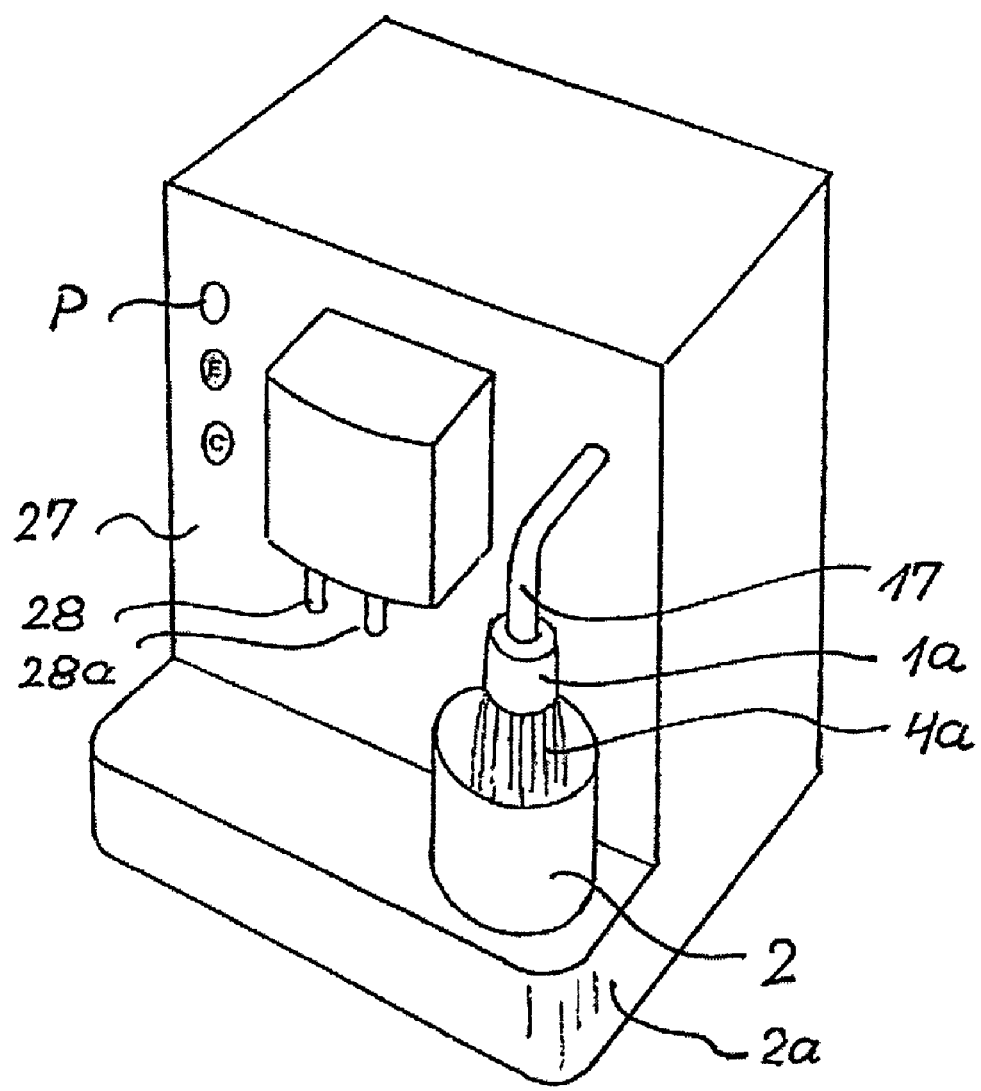
FIG. 1 shows in a diagrammatic perspective illustration a coffee machine including a milk froth generating device in operation.

In FIGS. 2 through 6, each, it is only the hot water sprayer head of the milk froth generating device which is shown, not, however, the hot water pressure generator in combination with a water heater in connection with the hot water sprayer head, both belonging to a common coffee machine, particularly an espresso machine.

FIG. 1 shows diagrammatically a coffee machine of common structure comprising a, not visible, water heater and a hot water pressure generator. On one front side 27, operating knobs for switching on P and for preparing espresso E and cappuccino C can be seen. Outlet tubes 28 for espresso and a hot water sprayer head 1 for milk froth preparation of the milk froth extend from the front side.

Using the coffee machine, by activating hot water sprayer head 1a in a frothing vessel 2 disposed on a base 2a of the coffee machine, milk froth can be generated as will further below be explained and the milk froth can subsequently be brought together with espresso or coffee that has been prepared by the same machine.

FIG. 2 shows how hot water sprayer head 1a for preparing milk froth is arranged above a portion of milk powder 7 placed in a frothing vessel 2. Hot water sprayer head 1a is disposed spaced above milk powder 7. Via a hot water supply 17, hot water sprayer head 1a receives hot water under high pressure from the water heater and the hot water pressure generator of the coffee machine. From FIG. 2, it can be taken how outer water jets 1a, 1b and inner water jets 6 coming from hot water sprayer head 1a impinge, approximately uniformly distributed, onto the portion of milk powder 7 in order to dissolve it and to convert it for the greatest part, under the inclusion of air dragged along by the inner water jets and the outer water jets, to milk froth.

The configuration, particularly the even distribution of outer water jets 4a, 4b and inner water jets 6 results from the arrangement of hot water channels in hot water sprayer head 1a from the open sides of which they come out. As concerns the arrangement of the hot water channels, reference is made, to start with, to the simplest first embodiment of hot water sprayer head 1 shown in FIGS. 3 and 4, and, subsequently, the second embodiment of hot water sprayer head 1a according to FIGS. 1, 2, 5 will be dealt with. The underside of hot water sprayer head 1a, apart from possible dimensioning differences, is identical to the underside of hot water sprayer head 1 shown in FIG. 3 from which open sides of hot water channels 9, 12 can be taken.

FIG. 3 deals with inner hot water channels 12 designed as bores and disposed close to a non-designated central axis on an imaginary inner circle 5, and with hot water channels 9 having rectangle-shaped cross section formed out in a convex surface 3 of the inner body. As can be taken from FIG. 3, the outer hot water channels 9 are uniformly spaced in circumferential direction of convex surface 3. The inner hot water channels 12, too, are uniformly spaced relative to each other on the imaginary circle 5 in circumferential direction.

In the first embodiment of hot water sprayer head 1, hot water channels 9 which constitute substantially hot water channel slits of uniform depth formed in cylindrical inner body 8 on the convex surface 3 thereof, compare also FIG. 4, are inclined towards the perpendicular in circumferential direction over the complete height of the cylindrical inner body.

The inner hot water channels 12 designed as bores, on the other hand, extend in all embodiments of the how water sprayer head non-inclined and perpendicular.

From FIG. 4, it can furthermore be taken how an outer body generally designated by reference numeral 11 encompasses cylindrical ring 20 which includes at the upper part thereof an internal thread 22 and encompasses upper part 21 from which projects downwardly an internal flange 23 having an external thread which engages in internal thread 22 to keep upper part 21 screwed to cylindrical ring 20. The interior space thereby formed, substantially a hot water distribution chamber 16, is sealed by means of a sealing ring 21 in the area of the screw coupling. Hot water supply 17 opens into the hot water distribution chamber defined above by upper part 21.

On one upper side 13 of cylindrical inner body 8, a distance ring 24 is formed out, as can furthermore be taken from FIG. 4, on which a sieve 19 is disposed. The sieve is kept between distance ring 24 and internal flange 23 of the upper part.

The second embodiment according to FIG. 5 differs from the first embodiment according to FIGS. 3 and 4 essentially in that outer hot water channels 9a do not extend over the total length thereof, inclined relative to the vertical in circumferential direction, in the lower sections thereof, however, they do. The outer hot water channels 9a, in addition, are radially inclined also relative to the central axis not shown of hot water sprayer head 1a since the lower part of inner body 8a is bell-shaped or truncated cone-shaped, respectively.

The outer hot water jets 4a, 4b from hot water sprayer head 1a of FIG. 2, correspondingly, do not on extend in an inclined manner relative to the vertical in peripheral direction but also downwardly enlarged in radial direction and impinge inclinedly on milk powder 7. In view of the enlargement of the outer hot water jets, a large portion, or surface, respectively, of milk powder can be treated with the hot water jets from the compact hot water sprayer head 1a. The inner hot water jets may in this case, as in the case of the first embodiment, flow perpendicularly as well.

The third embodiment, according to FIG. 6, of hot water sprayer head 1b differs from the second embodiment according to FIG. 5 in that the third embodiment includes an integral outer body 11a consisting of upper part section 21a and a substantially bell-shaped ring section 20b, an inner body 8b having an exterior thread 29 at its upper section being screwed into an internal thread 30 of outer body 11a. Hot water sprayer head 1b, can, therefore, easily be opened for maintenance purposes, to which end a coin slit 31 is provided, and closed at the end. Hot water channel slits 9b in the convex of inner body 8b are essentially designed as are hot water channel slits 9a of the second embodiment and penetrate with upper sections thereof throughout internal thread 30. To hold sieve 19 to an inner edge, at the bottom of a hot water distribution chamber 16a peripheral projections 24b are provided formed out above from the inner body.

The invention claimed is:

1. Milk froth generating device for generating milk froth from milk powder and hot water comprising a hot water supply, said milk froth generating device comprising:
    a substantially rotation-symmetrical hot water sprayer head having hot water channels downwardly directed and open at the bottom, some of which being disposed close to an outer convex surface of said hot water sprayer head and some extending close to a central axis of said hot water sprayer head, and
    said hot water channels being connected via a hot water distribution chamber in said hot water sprayer head, with a hot water supply duct, and wherein:
    said hot water sprayer head has a substantially cylindrical inner body in the outer convex surface of which laterally open hot water channel slits are formed out, and which includes bores extending close to the central axis as hot water channels,
    over the cylindrical inner body an essentially cylindrical ring, or ring section, respectively, is slipped which laterally covers tightly said hot water channel slits,
    said ring, or ring section, respectively, constitutes a component of an outer body which additionally has an upper part or upper part section, respectively, and
    between an inner underside of said outer body and an upper side of said inner body, the hot water distribution chamber is left free into which the hot water supply duct opens which is disposed in the upper part, or upper part section.

2. Milk froth generating device according to claim 1, wherein close to the outer convex surface of said hot water sprayer head about 10 hot water channels are disposed at peripheral distances identical relative to each other, and close to the central axis of the hot water sprayer head, 3 to 4 hot water channels are arranged in peripheral distances identical relative to each other.

3. Milk froth generating device according to claim 1, wherein at least one lower section each of said hot water channels disposed close to the outer convex surface is inclined relative to the perpendicular in peripheral direction about 2 to 12° and that said hot water channels disposed close to the central axis of said hot water sprayer head extend in parallel to the central axis.

4. Milk froth generating device according to claim 3, wherein only one lower section each of said hot water channels disposed close to outer convex surfaces is inclined about 2 to 12° relative to the perpendicular.

5. Milk froth generating device according to claim 3, wherein said hot water channels disposed close to the outer convex surface are inclined over the whole length relative to the perpendicular about 2 to 12°.

6. Milk froth generating device according to claim 1, wherein
    said inner body and the ring covering it, or the ring section, respectively, are downwardly broadening truncated cone-shaped, and
    said outer hot water channels are also radially outwardly declined.

7. Milk froth generating device according to claim 6, wherein said truncated cone-shaped inner body and the outer body covering it with a ring section, each, include an upper cylindrical section serving for easy removable fixation of said inner body in said outer body, said upper cylindrical section being provided with fixation elements, particularly a thread which is shaped on inner body as an external thread penetrated by sections of said hot water channel slits.

8. Milk froth generating device according to claim 6, wherein
said truncated cone-shaped inner body includes a band which fits into an inner ring groove in said truncated cone-shaped ring into which said inner body can be inserted, and
said inner body and/or the ring consist of elastic material so that the inner body is force-lockingly, though manually releasably, supported in the ring.

9. Milk froth generating device according to claim 1, wherein a sieve is disposed in said hot water sprayer head, between said hot water distribution chamber and said hot water channels.

10. Milk froth generating device according to claim 9, wherein said sieve is supported between an internal flange in the upper part and at least one spacer formed out from the upper side of said inner body.

11. Milk froth generating device according to claim 9, wherein
said pot-shaped outer body consists of said upper part and a cylindrical section of ring screwed into it, which is solidly connected with said inner body,
from said upper part, said internal flange is formed out which has an external thread, and
in one upper cylindrical section of ring an internal thread is provided which can be screwed into the external thread on said internal flange.

12. Milk froth generating device according to claim 11, wherein a sealing ring between said upper part and said ring is in a screwed-together state.

13. Milk froth generating device according to claim 1, wherein said froth generating device consists of poorly thermo-conductive material.

14. Milk froth generating device according to claim 13, wherein the insert consists of Neoprene.

15. A coffee machine, particularly an espresso machine, comprising a milk froth generating device according to one of claims 1, 2, 3, 4, 5 and 6.

* * * * *